Sept. 15, 1931.  J. F. O'CONNOR  1,823,756
HAND BRAKE
Filed Nov. 18, 1929
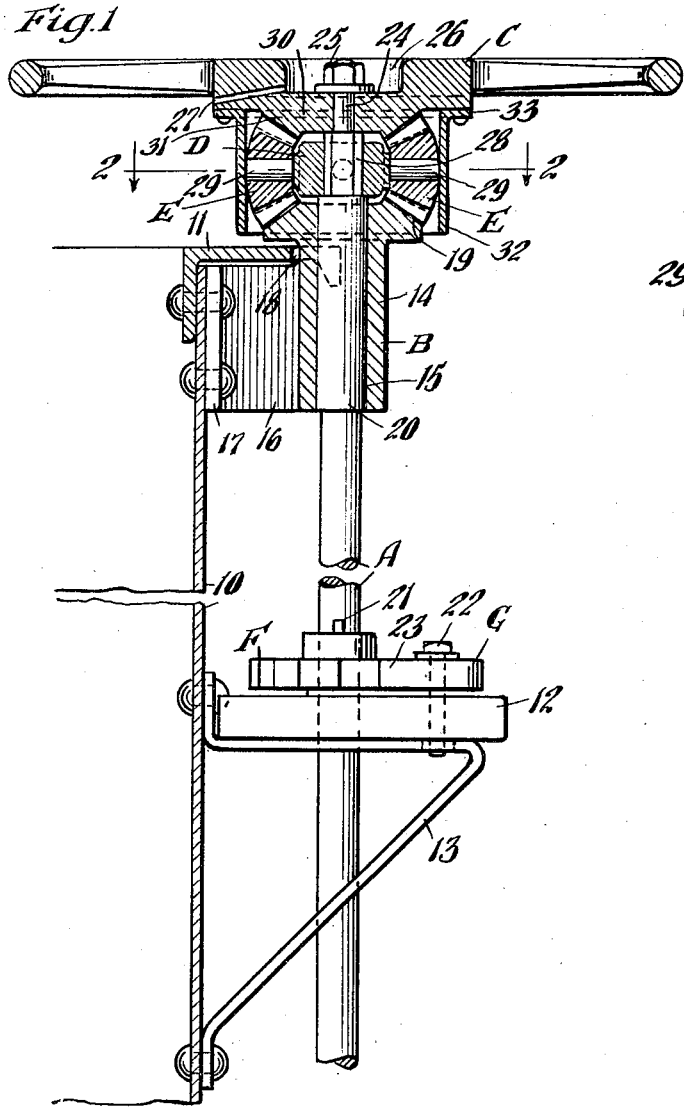
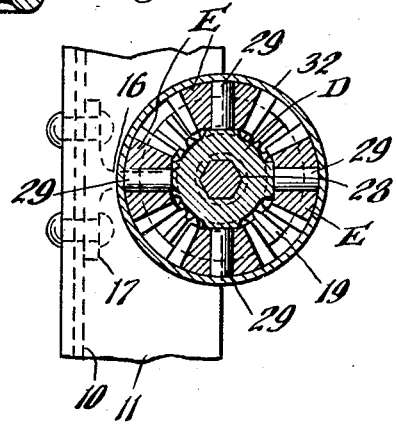
Inventor
John F. O'Connor
By Joseph Harris
his Atty.
Witness
Wm. Geiger Patented Sept. 15, 1931

1,823,756

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

HAND BRAKE

Application filed November 18, 1929. Serial No. 407,911.

This invention relates to improvements in hand brakes.

One object of the invention is to provide a simple and efficient hand brake mechanism including an operating member and a chain winding member, wherein means is provided for multiplying the power applied to the winding member whereby the brakes may be tightly applied without excessive exertion.

A further object of the invention is to provide a power multiplying means for hand brakes of the type indicated in the preceding paragraph, wherein the power multiplication is effected by power multiplying gearing and the gearing is encased in a simple and efficient manner so as to protect the same from the weather and also prevent clogging of the parts thereof by cinders, dirt, grit and other foreign material.

A more specific object of the invention is to provide a power multiplying hand brake of simple and rugged design and compact arrangement, by the employment of a planetary system of gearing for multiplying the power, comprising a gear member operated by the hand wheel of the brake and formed integral therewith, a fixed annular gear member on the support for the brake winding means and a gear having planetary movement about the winding member, being operatively connected thereto and meshing directly with the gear of the hand wheel and the fixed annular gear respectively.

Other objects of the invention will more clearly appear from the description and claim hereinafter following.

In the drawings, forming a part of this specification, Figure 1 is a vertical sectional view through the end portion of a freight car of the gondola type illustrating my improvements in connection therewith. And Figure 2 is a horizontal sectional view, partly broken away, corresponding substantially to the line 2—2 of Figure 1.

In said drawings, 10 designates the vertical end wall of the car, the same being provided with the usual angle plate 11 at the top thereof forming a reinforcing means for the upper edge of the end wall. The brakeman's platform is designated by 12 and is supported by the usual brackets 13 which are secured to the end wall 10 of the car.

My improved brake mechanism comprises broadly a vertical staff A; a supporting bracket B; an operating hand wheel C carrying an annular gear member; a spider D fixed to the staff A; a plurality of planetary gear members E—E carried by the spider and meshing with a fixed gear member carried by the bracket B; a ratchet F and a locking dog G.

The bracket B is in the form of a casting having a substantially cylindrical section 14 provided with a vertical bore 15 adapted to rotatably receive the brake staff member A. The bracket is secured to the end wall 10 of the car, having a web 16 connecting the enlarged section 14 to a securing plate portion 17 which is riveted to the end wall 10 of the car.

As most clearly shown in Figure 1, the horizontal flange portion of the angle member 11 is cut away as indicated at 18 to accommodate the cylindrical portion 14 of the bracket B, which projects above the horizontal flange. The cylindrical section 14 of the brake is enlarged at the upper end thereof and provided with an annular series of gear teeth 19. The enlarged portion forms in effect a fixed gear or annular rack member.

The brake staff A is of the vertical type and has an enlarged portion 20 thereof rotatably journaled in the opening 15 of the bracket B. The staff A extends through the platform 12 and has the usual chain winding section, not shown, at the bottom end thereof. The ratchet wheel F is disposed above the platform 12 and is suitably fixed to the staff A, the same being secured thereto by a key 21, as shown. The locking dog G is of the usual type and is pivotally supported on a bolt 22 and has a tooth portion 23 which cooperates with the ratchet member F to prevent backward movement thereof so as to lock the same and the staff against rotation when the chain is wound thereon. At the upper end, the staff A is provided with a reduced cylindrical journal portion 24 on which the hand wheel C is rotatably mounted. The hand wheel C is preferably held to the staff A by means of a nut 25 threaded on the upper end of the staff, a washer being preferably interposed between the nut and the hand wheel. As shown, the hand wheel C is provided with a pocket 26 which accommodates the nut 25. In order to prevent the accumulation of water in the pocket 26, a drain opening 27 is provided which extends through the hub of the hand wheel and communicates with the pocket.

Between the journal portion 20 and the reduced journal portion 26, the staff A is provided with a hexagonal section 28 on which the spider D is mounted. The spider D has a plurality of radially extending arms 29—29, preferably four in number. Each arm 29 is in the form of a cylindrical shaft member.

The hand wheel C is provided with a projecting section 30 at the bottom side of the hub thereof, having gear teeth 31 thereon in annular arrangement.

The planetary gear members E—E are four in number, as shown, and are rotatably mounted on the journal members 29—29 of the spider D. Each of the gear members E meshes with the gear 31 of the hand wheel C and the gear 19 of the brake B respectively, the gear members 31, E and 19 being preferably of beveled type.

In order to prevent damage to the gearing comprising the members 31, E and 19 and also prevent clogging of the gears due to foreign material, I provide the hand wheel C with a depending housing section 32. As shown most clearly in Figure 1, the housing 32 is in the form of a hollow cylinder having an outstanding horizontal flange 33 at the upper side thereof, by which the same is secured to the hub section of the hand wheel C. As most clearly illustrated in Figure 2, the bevel gear members E—E have the outer end faces thereof rounded off so as to conform to the curved interior wall of the housing 32 so as to prevent endwise movement of the bevel gears on the shafts 29 and also distribute the wear between the bearing surfaces of the gears and the wall of the housing.

The operation of my improved hand brake mechanism is as follows: In tightening the brake chain for applying the brakes, the hand wheel is rotated in a clockwise direction as viewed from the top of Figure 1. Rotation of the hand wheel in this direction will effect movement of the planetary gear members E about the axis of the brake staff A. Inasmuch as the planetary gears also mesh with the relatively fixed annular gear member 19, the gears E will be forced to travel on the gear 19 about the staff A. As will be evident, the speed of rotation of the gears E about the axis of the staff will thus be half the speed of rotation of the hand wheel C, thereby multiplying the power in a two to one ratio. As the gears E are journaled on the spider D and the spider is secured to the staff B, the staff will be rotated at half the speed of rotation of the hand wheel C, while the brake chain is being wound thereon.

In order to release the brakes after being wound, the locking dog G is disengaged from the ratchet wheel F in the usual manner, permitting the unwinding of the chain due to the tension thereon, or allowing the brakeman to ease off the brakes by turning the hand wheel C in a counter-clockwise direction as viewed from the top of Figure 1.

From the preceding description taken in connection with the drawings, it will be evident that I have provided an exceedingly simple and rugged construction of hand brake mechanism and power multiplying means for the same. By providing the co-axial arrangement of hand wheel, brake staff and planetary power multiplying gearing, an exceedingly compact arrangement of operating means is provided. Further, by housing the parts of the power multiplying mechanism, danger of interference in the operation, due to clogging by foreign material, is entirely eliminated and further the gearing is effectively protected from corrosion.

I have herein shown and described what I now consider the preferred manner of carrying out my invention, but the same is merely illustrative and I contemplate all changes and modifications that come within the scope of the claim appended hereto.

I claim:

In a hand brake, the combination with a vertical brake staff; of a supporting bracket having a bearing formed integral therewith, in which said staff is journaled; a hand wheel, said hand wheel having an upper portion which is journaled on the staff; a beveled gear member formed integral with the bracket; a spider fixed to said staff and having radially projecting trunnion means thereon; a beveled gear freely rotatable on each trunnion means and meshing with said first named bevel gear; a beveled gear freely rotatable on each trunnion means and meshing with said first named bevel gear; a beveled gear fixed to said hand wheel hub member and rotatable therewith, and meshing with said second named gears; and a housing fixed to said hub section of the hand wheel and enclosing all of said gears.

In witness that I claim the foregoing I have hereunto subscribed my name this 15th day of November, 1929.

JOHN F. O'CONNOR.